United States Patent [19]
Eisele et al.

[11] Patent Number: 6,034,995
[45] Date of Patent: Mar. 7, 2000

[54] SYSTEM FOR THE TRANSMISSION OF DATA VIA A DIFFERENTIAL BUS

[75] Inventors: Harald Eisele, Pinneberg; Robert Mores, Hamburg, both of Germany

[73] Assignee: U.S. Philips Corporation, New York, N.Y.

[21] Appl. No.: 08/776,919

[22] PCT Filed: Jun. 7, 1996

[86] PCT No.: PCT/IB96/00564

§ 371 Date: Feb. 10, 1997

§ 102(e) Date: Feb. 10, 1997

[87] PCT Pub. No.: WO96/42159

PCT Pub. Date: Dec. 27, 1996

[51] Int. Cl.[7] ................................................ H04B 3/50
[52] U.S. Cl. .................... 375/257; 375/285; 375/296; 333/24 R; 370/242; 370/284; 714/25
[58] Field of Search ..................................... 375/257, 285, 375/296; 370/216, 221–225, 242, 284; 371/20.1; 333/24 R; 714/25

[56] References Cited

U.S. PATENT DOCUMENTS

| | | | |
|---|---|---|---|
| 5,268,907 | 12/1993 | Suzuki et al. | 371/20.1 |
| 5,295,132 | 3/1994 | Hashimoto et al. | 370/242 |
| 5,781,585 | 7/1998 | Dorner et al. | 375/224 |

FOREIGN PATENT DOCUMENTS

| | | |
|---|---|---|
| 0506237A2 | 9/1992 | European Pat. Off. . |
| 0529602A2 | 3/1993 | European Pat. Off. . |

*Primary Examiner*—Amanda T. Le
*Attorney, Agent, or Firm*—Gregory L. Thorne

[57] ABSTRACT

The transmission of data via a differential bus by means of balanced signals is not only reliable, but also offers the advantage that in the event of various single faults, i.e. faults concerning only one of the two lines or faults where the two lines of the differential bus are short-circuited, data transmission is still possible, be it with a reduced reliability. To this end, both lines are connected to a number of comparators which have different threshold values so that the nature of a fault occurring can be determined and, in dependence thereon, the comparator output can be determined wherefrom the recovered data signal must be derived.

20 Claims, 4 Drawing Sheets

SYSTEM FOR THE TRANSMISSION OF DATA VIA A DIFFERENTIAL BUS

BACKGROUND OF THE INVENTION

The invention relates to a system for the transmission of binary data between a number of stations which are interconnected via a common first line and a common second line, the first line having a low potential and the second line a high potential for one logic value of the binary data whereas the first line has a high potential and the second line a low potential for the other logic value of the binary data, the logic value of the binary data being derived from the potential of at least one line for output on a data output.

SUMMARY OF THE INVENTION

The lines used in such systems for the transmission of data are often referred to as a differential bus, because the logic value of the transmitted binary data is represented by the difference between the potentials on the two lines, taking into account the sign of the difference. Such a differential bus offers the advantage that extraneous electromagnetic disturbances influence the potentials on the two lines in essentially the same way, so that the difference between the potentials remains substantially the same. This results in a very reliable data transmission. Moreover, the electromagnetic disturbances emitted by the two lines upon potential transitions essentially compensate one another.

Systems comprising a plurality of stations interconnected via a differential bus are often used in an environment in which the two lines are also subjected to notably mechanical loading, so that they are liable to be damaged. An example in this respect is the use of such a system in motor vehicles. Moreover, the two lines also extend at least partly very close to grounded metallic components.

EP 0 529 602 A3 discloses a receiver circuit whereby signals can be received and evaluated even if one of the lines is disturbed. For this purpose use is made of three comparators, each of which is succeeded by a counter and an AND-gate. One comparator compares the signals on the two lines with one another and hence operates for the non-disturbed case, whereas the other two comparators compare the signals on a respective line with a fixed threshold value so that in the case of a disturbance of one of the lines the signals on the other line alone can still be evaluated. The counters serve as timers which drive the associated AND-gate and inhibit the passing on of the high output signal of the comparator if the duration thereof exceeds a predetermined period of time. The AND-gates are succeeded by a selection circuit whose output supplies the output signals of the one comparator for the evaluation of the signal difference between the two lines if such output signals are generated, i.e. if the lines are not disturbed, and which otherwise delivers the output signals of the other comparators on its output. In the case of given line faults and signals, some signals may be lost, i.e. not be evaluated, due to the delayed blocking of the AND-gates and the switching operations in the selection circuit in response to the occurrence of a fault, so that the entire message must be repeated.

Therefore, it is an object of the invention to provide a system of the kind set forth in which data transmission without data loss is also possible in the case of given damage to at least one of the two lines, be it with a lower transmission reliability.

This object is achieved in accordance with the invention in that in at least a first station there is provided at least one first comparator which is coupled to both lines in order to subtract the potential on the first line from the potential on the second line and to output an output signal of a first value via a first comparator output if the difference formed by the subtraction exceeds a first threshold value, said first threshold value being chosen so that the output signal of the first comparator also changes its value if a potential transition occurs on only one of the two lines and the other line has a potential corresponding to the one logic value of the binary data.

As a result of the use of a comparator which forms not only the difference between the potentials on the two lines but also compares this difference with a given first threshold value, the transmitted data signal is also reproduced on the output of this comparator if one of the two lines is interrupted. Because, as is known, each line is connected to a low potential or a high potential via a resistor in such a manner that the potentials on the line correspond to the one logic value of the binary data if none of the stations applies a signal to the lines, and because these resistors are preferably provided for each station, an interrupted line has a substantially defined potential so that the none interrupted line can still be used for the transmission of data. Because of the steps taken in accordance with the invention, an interruption of only one line does not yet disturb the data transmission. A connection between the first line and a grounded metal component, i.e. a ground short circuit of the first line, does not yet disturb the data transmission either.

The described faults, notably an interruption of one of the two lines, may be considered to be the most probable faults. However, other faults are also feasible; notably the second line may also come into contact with a grounded metal component, or the two lines could be short-circuited to one another. In order to enable data transmission in principle even in such cases, an embodiment of the invention is characterized in that in each first station there is provided a second comparator which is coupled to the first line in order to generate an output signal of the first value on a second comparator output if the potential on the first line exceeds a second threshold value, and that there is provided a first memory which is coupled to the first comparator output via a first delay member having a first delay time, an output of said memory being coupled to a switch for switching the data output from the first comparator output to the second comparator output if the output signal on the first comparator output continuously has the first value for a period of time corresponding to the first delay time.

In the case of these faults, however, non-disturbed data transmission cannot take place at the instant of occurrence of the fault; a given period of time is then required so as to carry out the necessary switching. This is because transmission of data signals without simultaneous transmission of a clock signal must take place in such a manner that the clock signal can be derived from the data signal or is given for all stations. For this purpose there are a number of different codes (for example, NRZ modulation) enabling the failure of a normal data signal to be recognized already after a few clock periods. In this case the delay time may be chosen so as to be short, so that switching can take place rapidly. In the case of other codes, however, the logic value of the data signals is formed by a continuous signal so that successive data of the same logic value form a constant signal without signal transitions, the signal transitions being used only for synchronizing a clock generator at the receiver end. Special encoding steps then ensure that the number of successive data of the same logic value does not exceed a maximum number. In this case the first delay time must be chosen to be longer than the duration of the maximum number of successive same data at the lowest transmission frequency. If one of the latter two faults occurs directly after a signal transition or a potential transition on the two lines, the data subsequently transmitted during the first delay time is substantially lost. However, in most cases this can be compensated for by repeating the transmission of a data block which was being transmitted when the fault occurred, for example because the receiver has not acknowledged the disturbance-free reception of the data block.

It is desirable that the elimination of a fault during a data transmission does not cause a disturbance, if at all possible. Disappearance of the fault can occur, for example because a connection within one of the lines makes poor contact or because a ground short-circuit or a connection between the two lines disappears again due to mechanical shocks. For the first three faults disappearance and appearance have hardly any effect on the data transmission itself; only the reliability is enhanced again after the disappearance of such a fault. Disappearance of the last two faults switches the memory back again. However, in order to prevent brief disturbance signals on the lines from unduly switching back the memory, the first memory in each first station is preferably also coupled, via a second delay member having a second delay time, to the first comparator output in such a manner that the first memory switches over the switch in such a manner that the data output is switched back from the second comparator output to the first comparator output if the output signal on the first comparator output does not have the first value for a period of time corresponding to the second delay time.

It is thus reliably ensured that the first memory is not unduly switched back to the normal state by the disturbance signals.

In many cases not all stations, or even none of the stations, of the described system comprise their own power supply; instead, parallel to the two lines for the data transmission there is provided at least one further line which carries a supply voltage wherefrom a lower operating voltage is derived in each station for operation of an electric circuit in the station in order to drive the first and the second line. It may then occur that a fault brings the first or the second line into contact with the third line so that the potential on the relevant line becomes equal to the supply voltage. In order to enable data transmission via the non-disturbed line even in such a case, a further embodiment of the invention is characterized in that in each first station belonging to the stations thus powered there are provided a third, a fourth and a fifth comparator, the third comparator being coupled to the second line in order to generate an output signal of the first value on a third comparator output if the potential on the second line exceeds a third threshold value, the fourth comparator being coupled to the first line and the fifth comparator being coupled to the second line, each of the latter two comparators generating an output signal of a first value on a fourth and a fifth comparator output, respectively, if the potential on the line coupled to the relevant comparator exceeds a fourth threshold value which is valued between the operating voltage and the supply voltage, that there are provided a second and a third memory, each of which comprises a first input and a second input and an output, the first input of the second memory being coupled to the first comparator output, the second input of the second memory to the fourth comparator output, the first input of the third memory to the fifth comparator output, and the second input of the third memory being coupled to the fifth comparator output via a third delay member having a third delay time, and that the output of the second memory is coupled to the switch so as to couple the third comparator output to the data output, the output of the third memory being coupled to the switch so as to couple the second comparator output to the data output.

The fourth and the fifth comparator can immediately detect whether one of the two lines is short-circuited to the higher operating voltage. In the case of the first line the effect of such a short-circuit is as if this line continuously carries at least a potential corresponding to the second logic value of a binary data signal, so that the first comparator continuously supplies an output signal of the first value. Therefore, in this case the data output is coupled to the third comparator output which evaluates the signal on the second line which is assumed to be operational. However, if the second line is short-circuited to the supply voltage, the difference between this potential and the potential on the non-damaged first line is so negative that the threshold value of the first comparator is never exceeded and the signal on the first comparator output never assumes the first value. Therefore, in this case the data output is coupled to the second comparator output which evaluates the potential on the first line which is assumed to be non-damaged. It is again effective to couple the inputs of the memories to the corresponding comparator outputs via delay elements in order to prevent malfunctioning due to brief disturbance signals.

Generally speaking, it does not suffice that despite a fault data transmission is still possible on one of the two lines of the differential bus; such a fault should also be signaled to the environment via a fault indication output so that the fault can be removed. With the exception of the first three fault cases, in response to faults memories are switched over whose output signals can be used for fault indication. For the first three faults, however, additional fault detection is necessary. To this end, a further embodiment of the invention is characterized in that in each first station there are provided a first and a second counter, each of which comprises a count input, a reset input and a count output, the count input of both counters being coupled to the first comparator output, the reset input of the first counter to the second comparator output, the reset input of the second counter to the third comparator output, and the count output of both counters as well as the output of the storage members being coupled to the fault indication output. Each counter thus counts a number of signal transitions of the first comparator output and in the fault-free case with each such signal transition there is associated a corresponding signal transition on the second and on the third comparator output, so that the counters cannot count beyond their initial position. However, should one of the two lines be disturbed, the signal transitions will be absent on the corresponding second or third comparator output, so that the relevant counter can reach a fault position in which a fault signal is generated.

At least in stations which not only are capable of receiving but also of transmitting data each line is coupled, via an associated switch, to the potential for the other logic value of the binary data. Moreover, there is provided a drive circuit which in the fault-free case closes the two switches for the transmission of said other logic value of the binary data. However, if in the case of a fault, for example, one of the lines is low-impedance connected to a voltage which deviates from the potential corresponding to the other logic value, which deviation is detected upon reception of data, during the subsequent transmission the associated switch would establish a short-circuit between this potential and the voltage whereto the line is connected. This causes a higher power loss at the switch and higher loading of the voltage source powering the system or at least a few stations. In order to avoid this situation, the drive circuit is constructed so that it prevents the closing of the relevant switch in at least some fault cases.

As has already been stated, each of the two lines is connected, via a respective resistor, to another potential or another voltage defining the one value of the binary data on the lines. In one fault case, where one line is short-circuited to the voltage corresponding to the other value of the binary data or to the supply voltage or to the other line, a current flows continuously through the relevant resistor, or through both resistors, said current causing an increased power loss and higher loading of the power supply for the system. In order to avoid this situation, switches are preferably connected in series with both resistors in each station, said switches being opened in given fault cases. The output signals of the comparators, or of the memories succeeding these comparators, can be simply used to drive the switches.

In systems with a limited electric power, for example battery-powered systems as used in a motor vehicle, it is advantageous to provide a station standby state in which the power consumption is substantially reduced, for example by switching off the major part of the circuit in each station. The lines, however, in this state must have the same potentials as in the active state in order to ensure that a station can be set to the active state by a potential variation on the lines, i.e. the lines must still be connected to the corresponding potentials via the resistors. An increased power loss in the case of a fault would now be an even greater problem, so that for given faults it is absolutely necessary to disconnect the relevant resistor. For this purpose there are provided at least two further comparators which are active in the standby state and control the switches in series with the resistors.

The invention also relates to a station for use in the system according to the invention.

BRIEF DESCRIPTION OF THE DRAWINGS

Embodiments of the invention will be described in detail hereinafter with reference to the drawing. Therein.

DETAILED DESCRIPTION OF THE PREFERRED EMBODIMENTS

Figure 1:
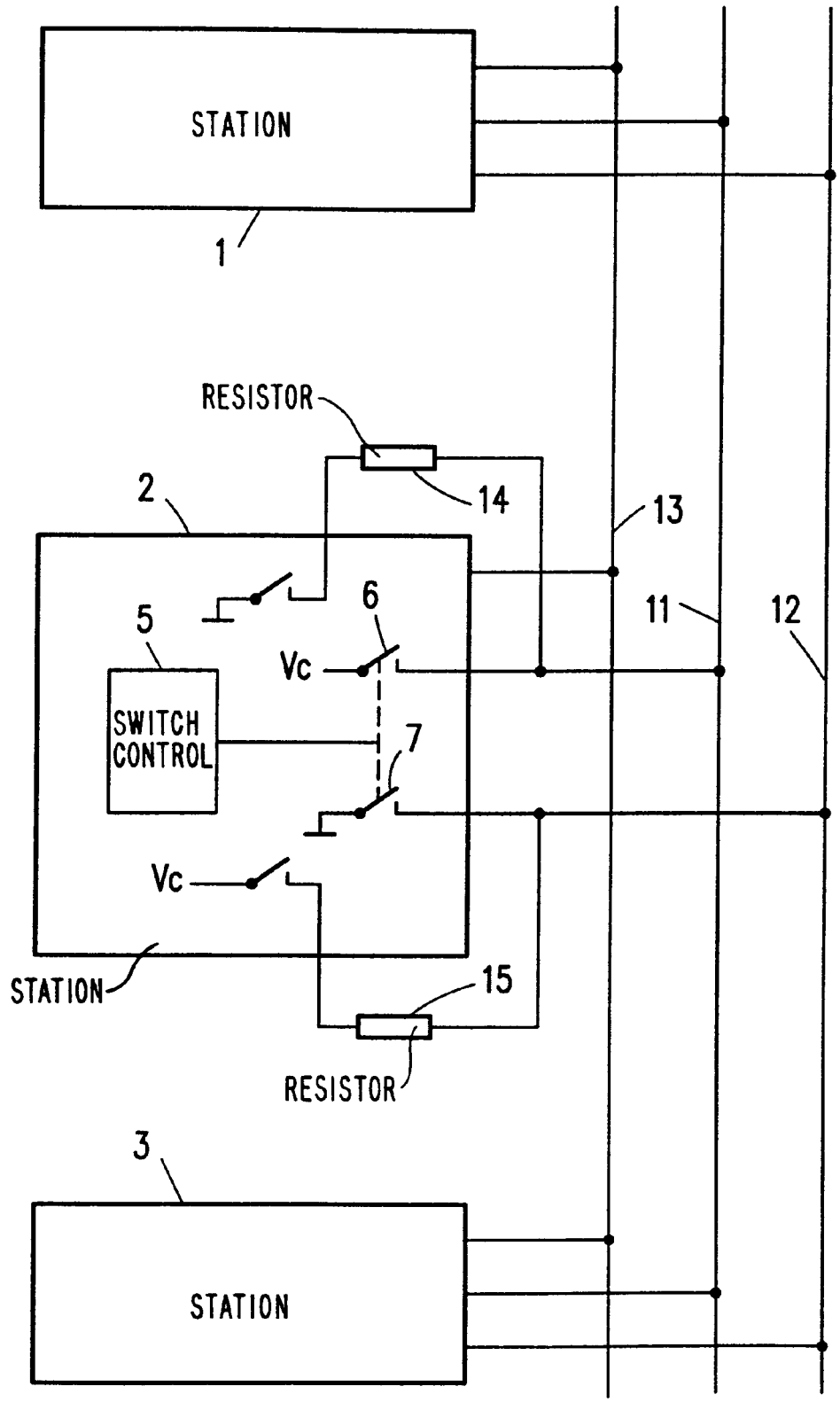
FIG. 1 shows diagrammatically a system comprising a plurality of stations plus their line connections.

FIG. 1 shows diagrammatically three stations 1, 2 and 3 which are interconnected via three lines 11, 12 and 13. The line 13 is in this case connected to a higher supply voltage wherefrom the individual stations derive the operating voltage for the electronic circuit accommodated therein. The lines 11 and 12 constitute the differential bus via which the data is transmitted.

Further details are shown for the station 2 but have been omitted for the stations 1 and 3 for the sake of clarity. The line 11 is connected to ground via a resistor 14 and a switch.

The line 12 is connected, via a resistor 15 and a further switch, to the operating voltage Vc which is derived from the supply voltage on the line 13 in the station. The function of the two, normally-closed switches will be described in detail hereinafter. Furthermore, the station 2 comprises a control device 5 which drives two switches 6 and 7 together, the switch 6 connecting the line 11 to the operating voltage Vc whereas the switch 7 connects the line 12 to ground. When the switches 6 and 7 are open, the line 11 carries a low potential, via the resistor 14, and the line 12 carries the operating voltage Vc via the resistor 15. This at the same time corresponds to the one logic value of the binary data signals to be transmitted. If the other logic value is to be transmitted, the control unit 5 closes both switches 6 and 7 so that the line 11 carries a high potential and the line 12 carries a low potential. Each of the stations 1 to 3 can thus transmit data via the lines 11 and 12. The state, or the potentials, on the lines 11 and 12 in the case of open switches 6 and 7, therefore, will be referred to as the recessive state hereinafter and the state in the case of closed switches 6 and 7 as the dominant state.

It is to be noted that instead of being connected to ground and to the operating voltage Vc, the lines 11 and 12 can also be connected to a voltage slightly higher than ground and slightly lower than Vc, respectively, via the switches, for as long as the difference between the two voltages remains large enough.

Figure 2:
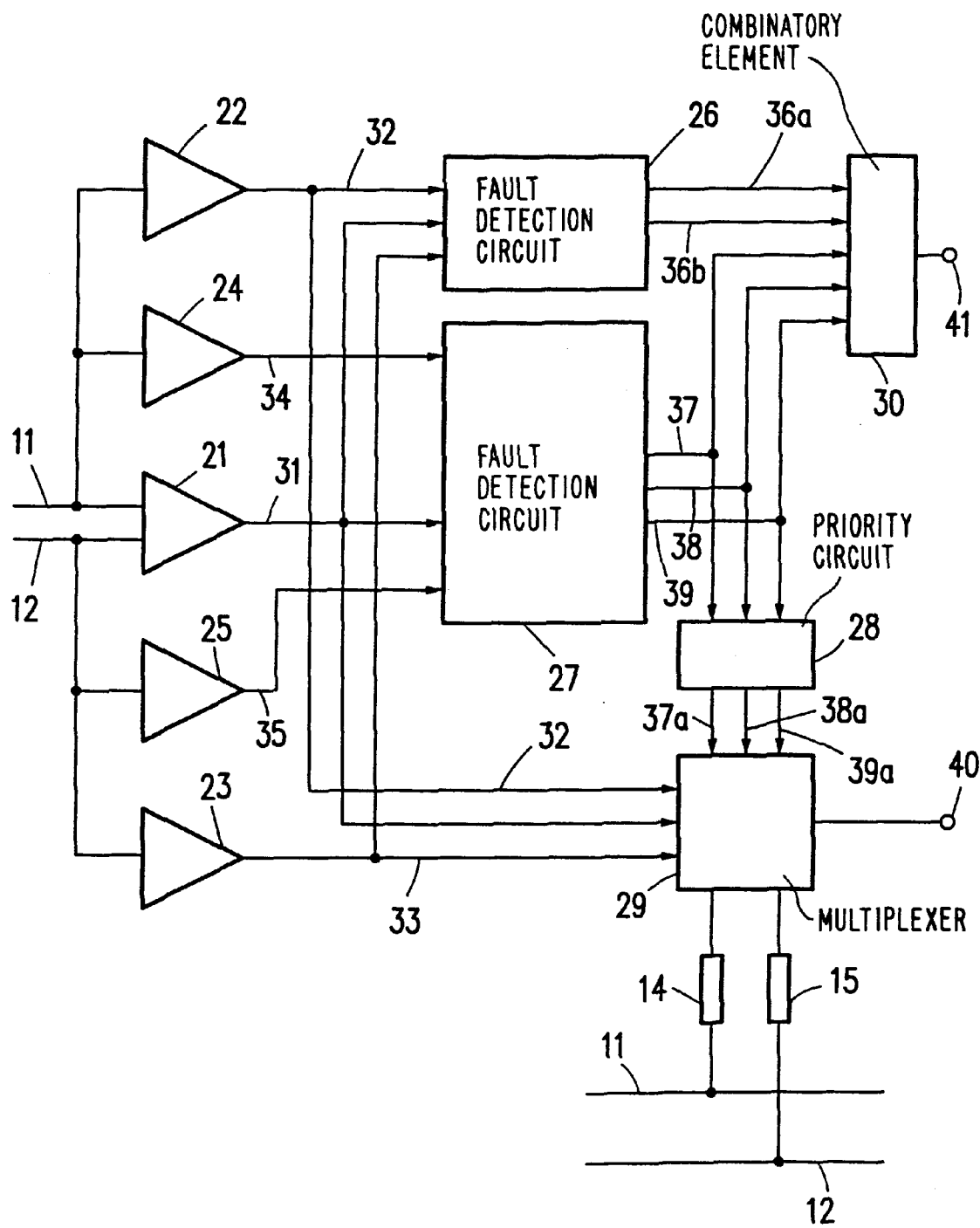
FIG. 2 shows a block diagram of the essential parts of a station.

FIG. 2 shows the circuit for evaluating the data transmitted via the lines 11 and 12 in a station. Both lines 11 and 12 are connected to a first comparator 21 which forms the difference between the potentials on the lines 11 and 12; more exactly speaking, it subtracts the potential on the line 12 from that on the line 11 and compares the difference of correct sign with a first threshold value. This threshold value is chosen so that a low output signal is generated on the line 31 only in the recessive state of both lines 11 and 12. The line 31 is connected to a multiplexer 29 which switches the line 31 to the data output 40 in the fault-free case and in given fault cases. The line 31 is also connected to two fault detection circuits 26 and 27 which will be described in detail hereinafter.

The line 11 is also connected to a comparator 22 which compares the potential on this line with a threshold value which is valued, taking into account tolerances, between the dominant and the recessive potential on the line 11. The comparator 22 generates a high signal on the line 32 if the potential on the line 11 exceeds the threshold value. The line 32 is connected to the fault detection circuit 26 as well as to the circuit 29 which connects this line to the data output 40 in given fault cases.

The line 11 is also connected to a further comparator 24 which compares the potential on this line with a voltage valued between the operating voltage of the circuit and the higher supply voltage on the line 13 in FIG. 1 and generates a signal on the line 34 if the potential on the line 11 exceeds the operating voltage. The line 34 is connected to the lower fault detection circuit 27.

Analogously, the line 12 is also connected to a comparator 23 which compares the potential on this line with a threshold value which is also valued between the dominant and the recessive potential. The comparator 23 generates a high signal on the line 33 if the potential on the line 12 is below the threshold value. The line 33 is connected to the upper fault detection circuit 26 and to the circuit 29 which connects this line to the data output in a given fault case as will be described in detail hereinafter.

The line 12 is also connected to a comparator 25 which compares the potential on this line with a threshold value which is valued between the operating voltage and the higher supply voltage, in the same way that is to say as in the comparator 24 for the potential on the line 11. The output line of the comparator 25 is also connected to the lower fault detection circuit 27. In case the operating voltage is applied directly to the individual stations instead of a higher supply voltage on the line 13, a short-circuit between the line 12 and the operating voltage will have the effect of an interruption of the line 12 so that it can also be dealt with as such.

The upper fault detection circuit 26 generates a fault signal on an output line 36a if the line 11 is interrupted or short-circuited to ground. A fault signal is generated on the line 36b if the line 12 is interrupted.

The lower fault detection circuit 27 generates a signal on an output line 37 if the two lines 11 and 12 are short-circuited to one another or if the line 12 is short-circuited to ground or if the line 11 is short-circuited to the supply voltage. In this case a fault signal is also generated on the line 38. A fault signal is generated on the line 39 if the line 12 is short-circuited to the supply voltage.

All fault signals on the lines 36a, 36b and 37 to 39 are combined by a combinatory element 30 so as to be output via a fault indication output 41.

The lines 37 to 39 are also connected to a priority circuit 28 because in given fault cases more than one line carries a high signal but unambiguous control signals are required for the circuit 29 nevertheless. The line 38 has the highest priority; the line 39 has the highest priority but one, and the line 37 has the lowest priority. The construction of such a priority circuit 28 is generally known. The signals on the lines 37 to 39 are indicated in conformity wit their priority on the lines 37a to 39a.

The circuit 29 also includes switches, as indicated in the station 2 in FIG. 1, which connect the resistor 14, connected to the line 11, to ground and the resistor 15, connected to the line 12, to the operating voltage Vc.

The signals of the lines 37a to 39a can also be used to block the driving of the switches 6 or 7 in FIG. 1. For example, if the line 11 or the line 12 is short-circuited to the supply voltage on the line 13, driving of the switches 6 or 7 would establish a connection between the supply voltage and ground or the operating voltage. Depending on the ratio of the short-circuit resistance to the switch-on resistance of the switch, a high power loss occurs thereon. A signal on the line 38a (short-circuiting of the line 11 to the supply voltage), therefore, blocks the driving of the switch 6. Analogously, a signal on the line 37a (line 12 short-circuited to the line 11) or on the line 39a (line 12 short-circuited to the supply voltage) blocks the driving of the switch 7. A signal also occurs on the line 37a in the case which is not critical to the switch 7, i.e. the case where the line 12 is short-circuited to ground, but the blocking of the driving of the switch 7 is not a drawback in this case. On the other hand, in case the line 11 is short-circuited to ground, causing a signal on the line 36a, a higher power loss occurs on the switch 6, so that this switch should also be switched off in the event of this fault. The signal on the line 36a, however, also occurs in the case of an interruption of the line 11, in which case the switch 6 should then be driven further so as to ensure that elimination of this fault is directly recognized. If these two faults of the line 11 are not distinguished, requiring an additional expenditure, the driving of the switch 6 should not be blocked when the line 11 is short-circuited to ground.

Figure 3:
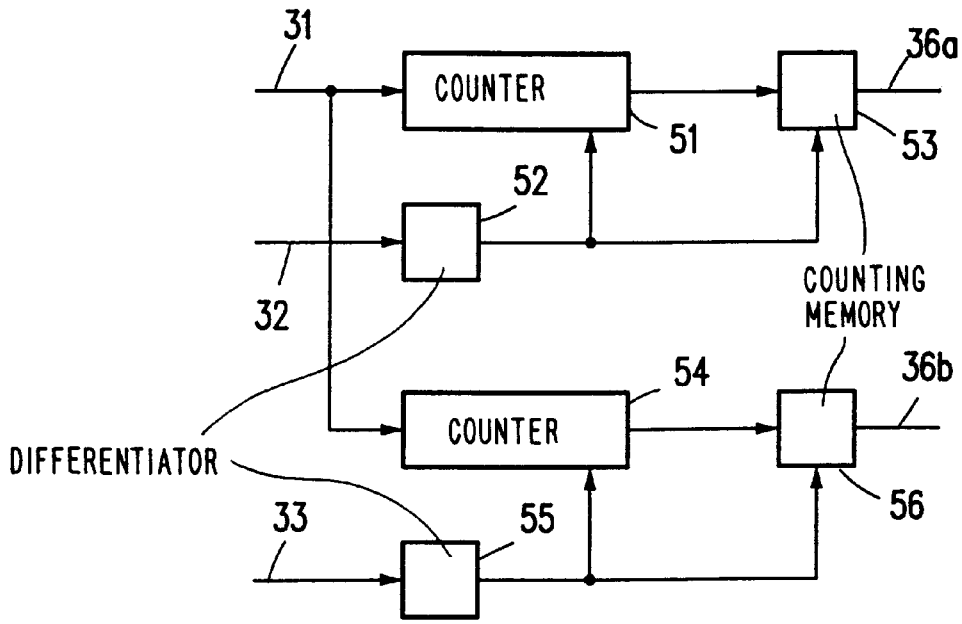
FIG. 3 shows a block diagram of one of the two fault detection circuits.

FIG. 3 is a more detailed representation of the construction of the fault detection circuit 26 of FIG. 2. It includes two counters 51 and 54, two differentiating circuits 52 and 55 as well as two counting memories 53 and 56. The counting inputs of the counters 51 and 54 are connected together to the line 31. The input of the differentiator 52 is connected to the line 32, and the differentiator 52 outputs a brief output signal if a signal edge occurs on the line 32 due to the transition of the signal on the line 11, and the signal from the differentiator 52 resets the counter 51 to an initial position and also sets the counting memory 53 to its rest state. The differentiating circuit 55 receives the signal from the line 33 and generates, on the basis of the signal transition occurring on the line 33 in response to the transition on the line 12, a brief output signal which sets the counter 54 to an initial position and the counting memory 56 to the rest state.

If the line 11 or 12 is interrupted, signal transitions still occur on the line 31 and are counted by the two counters 51 and 54; however, depending on the interrupted line, no corresponding signal transition occurs on the line 32 or the line 33, so that the associated counter 51 or 54 is not reset but reaches a count at which the counting memory 53 or 56 is set. A fault signal is thus generated on the corresponding line 36a or 36b. Instead of using the counting memories 53 and 56, it is also possible to block the further counting by the counters when they reach the corresponding count. If the fault disappears or has been removed, a counting memory in the set state or a blocked counter is automatically reset, because in that case signal edges occur again on both lines 32 and 33.

Figure 4:
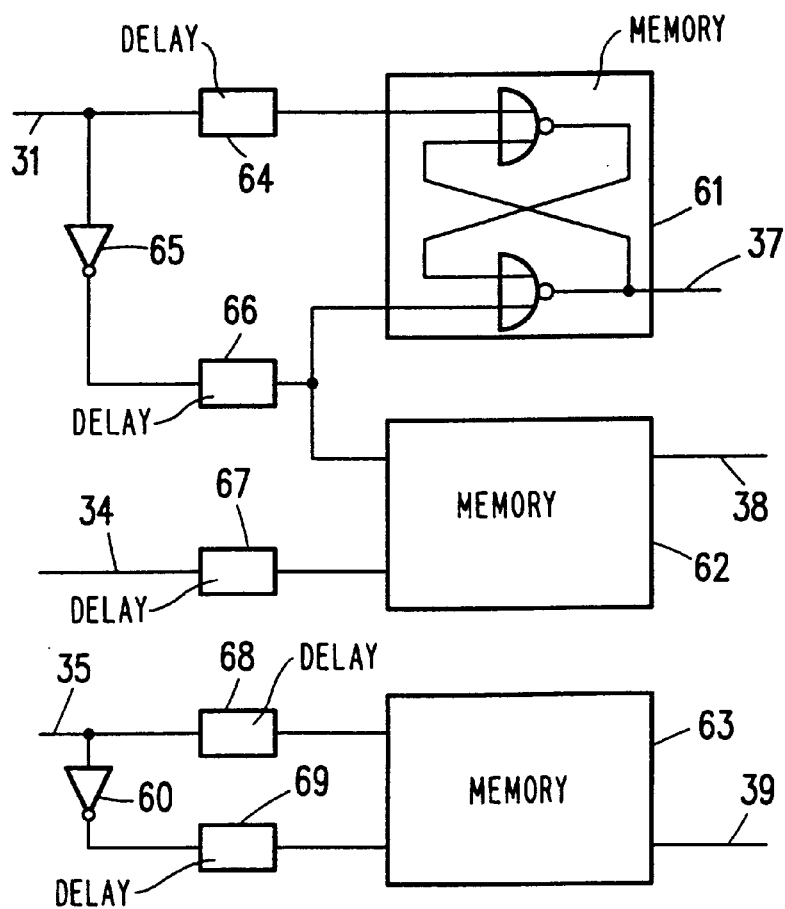
FIG. 4 shows a block diagram of the further fault detection circuit.

The construction of the fault detection circuit 27 of FIG. 2 is shown in greater detail in FIG. 4. It comprises three memories 61, 62 and 63, each of which is composed of two cross-coupled NOR-gates, the further inputs of the NOR-gates constituting the inputs of the memory. For the sake of clarity, however, the construction is shown only for the memory 61. Use can also be made of other, so-called R-S flipflops.

The upper input of the memory 61 is connected to the line 31 via a first delay member 64. As soon as the line 31 carries a high signal for a continuous period of time which is longer than the delay time of the first delay member, the output of the delay member 64 becomes high and a high signal is generated on the output line 37. This persistent high signal appears on the line 31 if one of the two lines is continuously in a dominant state due to a fault. This is the case if the two lines are short-circuited to one another, because in that case the two lines do not simultaneously have a recessive state at any instant and the signal on the line 31 does not become low. The delay time of the delay member 64, therefore, must be longer than the maximum duration of a maximum number of transmitted data of the same value.

If such a fault has been removed and the signal appears on the line 31 in the case of a recessive state on both lines 11 and 12, the memory 61 is reset again via an inverter 65 and a further delay member 66 which is connected to the lower input of the memory 61, and the signal on the line 37 is made low. The delay member 66 serves to prevent undue resetting of the memory 61 by brief disturbance signals in the case of a fault.

One input of the memory 62 is connected to the line 34, via a delay member 67, and its other input is connected to the delay member 66. The two delay members preferably have approximately the same delay time. As soon as the line 11 is short-circuited to the supply voltage, a high signal appears on the line 34 and, if this signal prevails for a period of time which is longer than the delay time of the delay member 67, the memory 62 is set and a high signal is generated on the line 38. This state is the dominant state of the line 11 and as long as this state prevails no signal transitions are produced on the line 31, so that the memory 62 remains set. It is only after the fault has been removed and signals appear again on the line 31 that the memory 62 is reset, so that the signal on the line 38 then becomes low again. However, the resetting of the memory 62 can alternatively be realized by the signal on the line 34 via an inverter (not shown).

Via a delay member 68, one input of the memory 63 is connected to the line 35 which carries a high signal if the line 12 is short-circuited to the supply voltage. If the duration of this short-circuit is longer than the delay time of the delay member 68, preferably being approximately equal to the delay time of the delay members 67 and 66, the memory 63 is set and a high signal appears on the line 39.

The other input of the memory 63 is connected to the line 35 via a further delay member 69 and an inverter 60. The delay time of the delay member 69 is substantially longer and is dependent on the circumstances during a standby state of the overall system which will be described in detail hereinafter. It is to be noted that in this standby state a potential higher than the operating voltage occurs on the line 12, even in the absence of a fault, so that the memory 63 is always set in the standby state. In this state, however, no data transmission takes place and a fault signal is not evaluated either.

Figure 5:
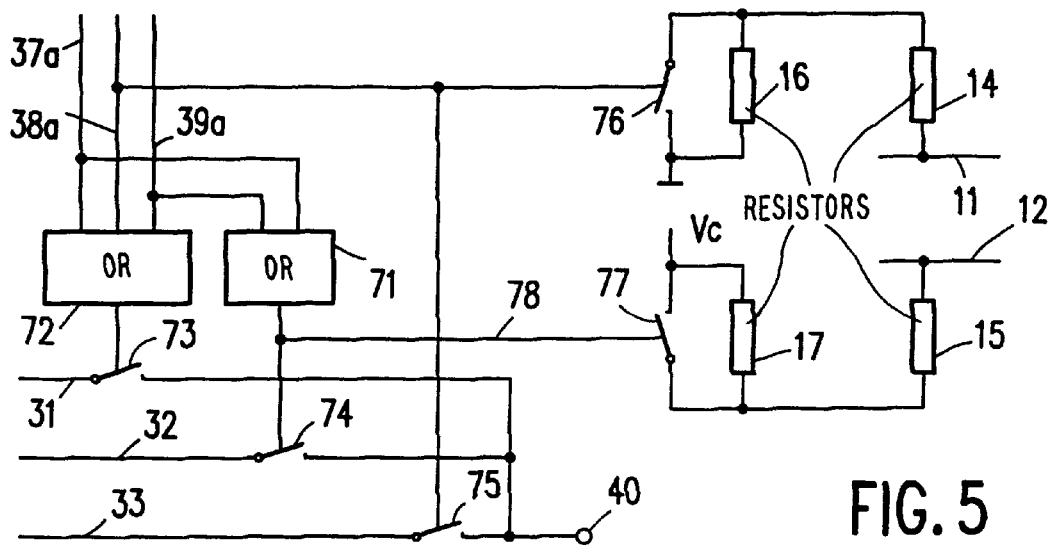
FIG. 5 illustrates the control of the data output and the terminating resistors.

FIG. 5 shows the construction of the circuit 29 of FIG. 2 in more detail. The line 37a, carrying a signal if the line 12 is short-circuited to ground or to the line 11 as described before, is connected to an input of an OR-gate 71 and of an OR-gate 72. The output signal of the OR-gate 72 on the line 79 opens the switch 73, thus interrupting the connection between the line 31 and the data output 40, so that the signal on the data output 40 is no longer derived from the comparator 21 in FIG. 2. On the line 78 the OR-gate 71 generates a signal which closes the switch 74 so that the line 32 is then connected to the data output 40 and hence the signal on the data output is derived from the comparator 22 in FIG. 2. Moreover, the signal on the line 78 opens a switch 77 which connects the line 12 to the operating voltage Vc via the resistor 15. Thus, in case the line 12 is short-circuited to ground, a current cannot be dissipated continuously from the operating voltage via the resistor 15 or, in case the line 12 is short-circuited to the line 11, the recessive potential on both lines cannot rise excessively. Merely a connection remains between the line 12, via the resistor 15 and a very high-valued resistor 17, and the operating voltage Vc in order to ensure that the line 12 does not assume an undefined potential after removal of the fault.

The line 38a, carrying a signal if the line 11 is short-circuited to the higher supply voltage, is also connected to an input of the OR-gate 72, so that in this case the connection between the line 31 and the data output 40 is also interrupted. Moreover, the signal on the line 38a drives a switch 75 which then connects the line 33 to the data output 40 and, furthermore, a switch 76 is opened so that the line 11 is no longer connected to ground via the resistor 14 and hence an unnecessary current through the resistor 14 is avoided. The line 11 is still connected to ground merely via the series connection of the resistor 14 and the very high-valued resistor 16; this is done for the same reasons as described above for the line 12 and the series connection of the resistors 15 and 17. If the short-circuit of the line 11 to the supply voltage is not very low-impedance and a voltage division occurs in all stations connected to the line 11, because of the resistors 16 initially connected to ground, so that because of the tolerances of the threshold voltages of the comparators 24 in the stations only one of these comparators is switched over and disconnects the resistor 16, the voltage division changes in such a manner that the voltage on the line 11 becomes higher. Consequently, in at least one further station the comparator 24 will be activated and disconnect the resistor 16 in this station etc., until all stations have the same state with a disconnected resistor 16. The reverse effect occurs if the short-circuit between the line 11 and the supply voltage assumes a higher resistance, so that the comparator 24 in at least one station is activated in the opposite direction. In that case all stations again successively assume the same state. In both cases a kind of hysteresis occurs due to the described effect.

The line 39a, carrying a signal if the line 12 is short-circuited to the higher supply voltage, is connected to an input of the OR-gates 71 and 72, that is to say in the same way as the line 37a, so that the switches 73 and 77 are opened and the switch 74 is closed and hence the line 32 is connected to the data output 40.

It is to be noted that the states on the lines 11 and 12 are determined not only by the resistors 14 and 15 of the relevant station but also by the corresponding resistors of the other stations.

A system of the kind set forth is often used in an environment in which the source delivering the higher supply voltage contains a limited amount of energy only. This is the case notably if the described system is used in a motor vehicle. Therefore, for a system of this kind there is provided not only a normal transmission mode but also a standby state in which, even though correct reception and transmission of data is not possible, the data transmitted by other stations can be interpreted as a request to change over to the normal transmission mode if given criteria are satisfied. This change-over is also referred to as prompting. For example, if no data has been transmitted during a predetermined period of time, a station can thus be set to a state of very low power consumption, i.e. the standby state; however, it can be returned to the normal transmission state at any time under the control of the transmission lines. The power consumption in the standby state should be as low as possible, because the overall energy consumption increases in proportion to the number of stations in a system.

The desired minimum power consumption in the standby state, however, is opposed by the fact that in each station the operating voltage for the electronic circuit is derived from the higher supply voltage, i.e. from the battery in the case of a motor vehicle, and a voltage stabilization circuit required for this purpose needs, like the further circuit in each station, a minimum current which is larger than the desired current in the standby state. Therefore, in the standby state the voltage stabilization circuit is completely switched off, so that an operating voltage is not present any longer. Consequently, in the standby state the line 12 no longer receives the recessive high potential via the resistor 15 in each station. This would not cause faults in the other switched-off stations, but it would then no longer be possible for a station which has been set to the normal transmission state, for example by a local facility such as a switch, to prompt all other stations by driving both lines of the bus. The condition that both lines must be driven for the prompting of the other stations is based on the fact that in the case of a fault in one line, it should still be possible to prompt all other stations.

Figure 6:
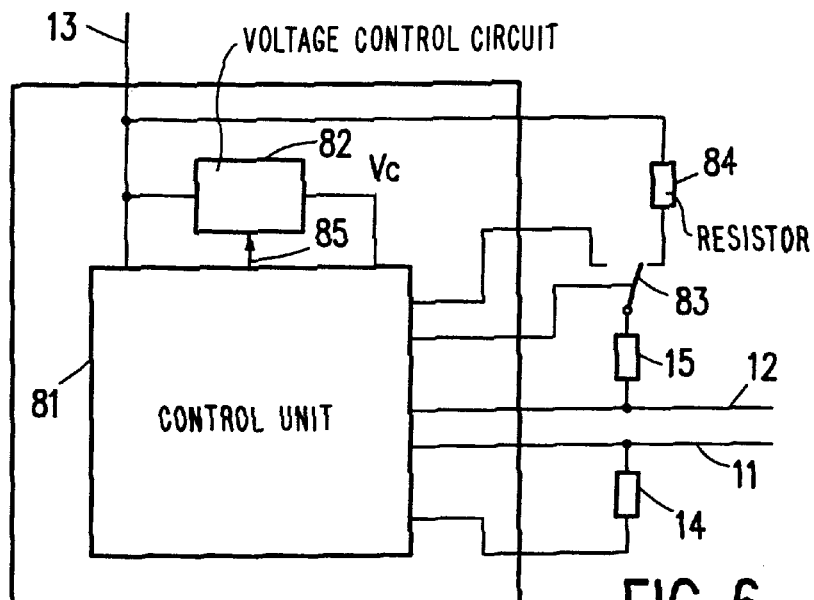
FIG. 6 shows the circuit diagram of a station for a standby state.

FIG. 6 shows a circuit which also enables fault-free operation in these circumstances. This Figure shows a station which receives a supply voltage via the line 13. The station comprises a control unit 81 which controls not only the transmission and reception of data via the lines 11 and 12, but also the setting to the standby state or the transmission state. The line 13 is connected to a voltage control circuit 82 which derives a stabilized operating voltage Vc therefrom for supply to the control unit 81. Moreover, the voltage control circuit 82 can be disconnected via the line 85 in order to set the station to the standby state in which the operating voltage Vc substantially disappears. Because the processing of a data transmission via the lines 11 and 12 must be operational in the standby state, for this part of the circuit, requiring very little current only, the line 13 is also connected directly to the control unit 81.

In order to ensure that in the standby state of all stations a data transmission for a prompted station can indeed commence, it must be ensured that a recessive high potential is present on the line 12 also in the standby state. This is no longer simply possible via the resistor 15 if the voltage Vc is absent in the standby state. Therefore, the line 13 carrying the higher supply voltage is connected, via a resistor 84, to a switch 83 which connects, under the control of the control unit 81, the two resistors 84 and 15 in series in the standby state and hence produces a potential on the line 12 which is approximately equal to the supply voltage on the line 13. This voltage is higher than in the normal transmission state, but no data transmission is desired in the standby state. The memory 63 of FIG. 4 is not set in the standby state, because the operating voltage is absent.

A station which is prompted by a local condition and commences a transmission first switches over the switch 83 again, so that the line 12 in this station is connected, via the resistor 15, to the operating voltage Vc which is then also switched on. However, because the line 12 in the other stations is still connected to the higher supply voltage via the resistor 84, the line 12 will initially carry a potential which is higher than that in the normal transmission state, with the result that the memory 63 (FIG. 4) is set in the initially prompted stations. However, as soon as the line 1 has carried the potential corresponding to the normal transmission state for a sufficiently long period of time, corresponding to the delay time of the delay members 69 in the individual stations, all memories 63 are ultimately reset again. Because normal data transmission is also possible in the set state of the memory 63, disturbances will not be introduced thereby.

Figure 7:
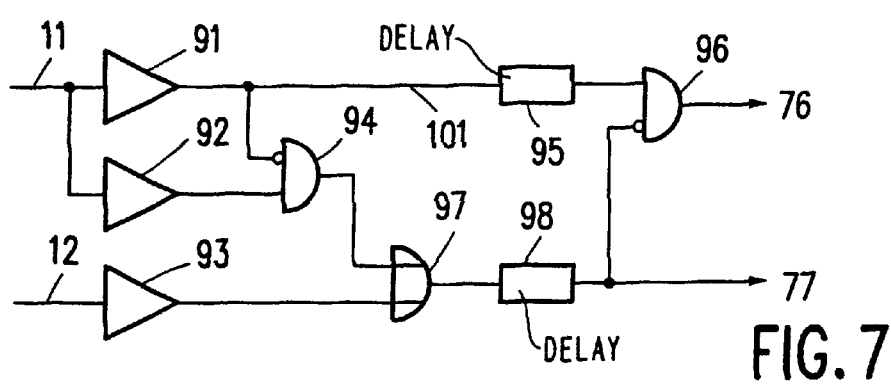
FIG. 7 shows a further fault detection circuit for the standby state.

However, faults could appear or be present on the lines 11 and 12 also in the standby state of all stations, but such faults may not lead to an increased power consumption. Therefore, there is provided a fault detection circuit which is operative in the standby state and is shown in FIG. 7. Therein, the line 11 is connected to two comparators 91 and 92 which compare the potential on the line 11 with various threshold values. The comparator 91 checks whether the potential on the line 11 exceeds a value which is slightly below the supply voltage on the line 13. This is the case if the line 11 is short-circuited to the supply voltage. The signal then generated on the line 101 is applied to an input of an AND-gate 96 via a delay member 95. The output of said gate is connected to the switch 76 in FIG. 5 and isolates the resistor 14 from ground, so that in the fault case no current can flow from the supply voltage via the resistor 14 or the resistors 14 in all stations, because all stations detect the same fault and isolate the resistor 14 from ground.

The line 12 carries a high potential in the recessive state as described above. However, if this line is short-circuited to ground, in each station a current would flow, via the resistors 15 and 84, from the supply voltage to ground via the resistor 15. The comparator 93 compares the potential on the line 12 with a threshold value between the dominant potential and the recessive potential and outputs a signal if the potential on the line 12 drops below this threshold value. This signal is applied, via the OR-gate 97 and a delay member 98, to the switch 77 in FIG. 5 so that the resistor 15 is no longer connected to the resistor 84 in FIG. 6 and hence no current can flow from the supply voltage to ground.

If the two lines 11 and 12 are short-circuited to one another, they have a common potential which may be valued between ground and a voltage below the supply voltage, depending notably on how many stations have already reacted to this fault. For detection there is provided the comparator 92 which compares the potential on the line 11 with a threshold value which is also valued between the dominant and the recessive potential, but is smaller than the threshold value of the comparator 93. It is thus ensured that at least one of the comparators 92 or 93 outputs a signal in the case of a short-circuit between the two lines 11 and 12. The output signal of the comparator 92 is applied to an AND-gate 94, an inhibit input of which is connected to the output of the comparator 91 because the comparator 92 also supplies an output signal if the line 11 is short-circuited to the supply voltage, in which case the output signal of the comparator 92 should not be active. Thus, if only the lines 11 and 12 are short-circuited to one another, the AND-gate 94 is enabled and the output signals of both comparators 92 and 93 are combined in the OR-gate and applied, via the delay member 98, to the switch 77 in FIG. 5. Moreover, the output signal of the delay member 98 is also applied to an inhibit input of the AND-gate 96 in order to prevent disconnection of the two resistors 14 and 15. However, this situation can occur only in the event of a multiple fault, so that this connection to the AND-gate 96, and even the gate itself, can also be omitted.

The function of the circuits described thus far will be explained in detail hereinafter.

Specification

The following fault states should be taken into account:
1. interrupted line 11
2. interrupted line 12
3. short-circuit line 11 to Vbat (supply voltage)
4. short-circuit line 12 to ground
5. short-circuit line 11 to ground
6. short-circuit line 11 to ground
7. short-circuit line 11 to line 12.

These faults should be detected and data transmission should nevertheless be possible. The appearance or removal of the faults 1 and 2 should not cause any faults in the data stream received. For the faults 3 to 7 data faults are temporarily permissible during the appearance or the elimination of the line fault, but subsequently the data transmission must be ensured again. Increased currents and accompanying higher temperatures should also be avoided.

In the standby state the line 12 carries the potential Vbat. Thus, in given circumstances other fault situations occur. The faults liable to cause increased currents in the standby state are the faults 3, 4 and 7.

Signal states

The data transmission takes place while using two different signal potentials. In the recessive state, no switch 6 or 7 in closed in any station, and hence the following signal potentials occur:

line 11: ground+$\Delta U$(0 . . . 0.25 V),
line 12: Vc–$\Delta U$(4.5 . . . 5.25 V) in the operating state and
 Vbat–$\Delta U$(6 . . . 27 V) in the standby state.

In the dominant state, the switches 6 and 7, connected to the lines, are closed in at least one station, so that the following signal potentials occur:

line 11: Vc−ΔU1 (minimum 3.35 V; typically 4 V)
line 12: ground+ΔU1 (maximum 1.4 V; typically 1 V).

Therein, ΔU1 denotes the voltage dropping off across the closed switches 6 and 7 due to the current through the terminating resistors. The termination of the two lines is distributed across all stations in the system. The equivalent resistance of all terminating resistors yields approximately the line impedance.

Problems encountered in fault detection

Line potentials in the fault state cannot always be unambiguously distinguished from the potentials during normal data transmission. For example, in the case of the fault 5 the line 11 is connected to ground potential in the same way as in the normal recessive state. In the case of the fault 4 the line 12 is connected to ground potential in the same way as in the dominant state. The large ground offset which may occur between the stations of the system makes the problem of lack of distinction more acute. Only the faults 3 and 6 lead to line potentials which can be unambiguously distinguished from those occurring during the normal data transmission. Other faults, which cannot be distinguished in the rest state, that is in the absence of data transmission, however, must be taken into account differently. For example, if the start of a data series is transmitted in the presence of a fault 1, the two lines are first recessive and only the line 12 then becomes dominant, after which transmission can take place only via the non-faulty line 12. On the other hand, if the fault 4 occurs while both lines are recessive, the line 12 again enters the dominant state, but the further data transmission should take place via the line 11. Therefore, it must be possible to distinguish these two faults from one another; however, this can be achieved only by an additional expenditure.

Fault analysis

Three comparators 21, 22 and 23 are used for the reception of data. The differential threshold voltage of the comparator 21 is fixed at −2.8 V, so that the dominant state of one of the two lines alone as well as of both lines together leads to a dominant signal on the comparator output. The comparator 22 evaluates only the state of the line 11 and has a threshold voltage of 1.8 V, whereas the comparator 23 evaluates only the state of the line 12 and has a threshold voltage of 3.0 V.

In the fault-free state, the data is received or evaluated via the comparator 21. The differential reception enhances the reliability of the data transmission in the case of ground offset between the stations and electromagnetic compatibility disturbances.

Because of the described choice of the threshold voltage of the comparator 21, the faults 1, 2 and 5 are tolerated without further steps being required. This is important because even in the case of static faults, the faults 1 and 2 possibly appear as recurrent faults. This is due to the fact that the position of the instantaneously transmitting station with respect to the fault location differs each time. In order to enable the fault to be signaled nevertheless, it must indeed be detected. This is achieved by comparing the output signals of the comparators 22 and 23, produced by the two lines alone, with the signal output by the comparator 21 which evaluates the differential signal of the two lines. To this end, the signal edges at the comparator 21 are counted in two separate counters; an edge at the comparators 22 or 23 always resets the associated counter immediately.

Thus, if the comparator 21 outputs, for example seven edges in succession and one of the comparators 22 or 23 does not output any edge during the same period of time, a fault is detected. It is considered to have been removed when the relevant comparator outputs an edge again.

In the case of the fault 3 the line 11 carries the potential of the supply voltage; this is unambiguously detected by the comparator 24 via its threshold voltage of 7.3 V with respect to ground. The output signal of the comparator is stored, via a filter having a delay time of from 10 to 60 μs, in the associated memory in order to avoid activation due to possible fault signals which briefly exceed the threshold voltage. When the fault is removed, the memory is reset if the comparator does not output a signal for at least a predetermined period of time, i.e. the line 11 carries a potential below said threshold voltage, or even better by a signal at the comparator 21 since the line 11 then even carries recessive potential.

In the case of the fault 6, the line 12 carries the potential of the supply voltage which is detected by the comparator 25, also having a threshold voltage of 7.3 V with respect to ground. The output signal thereof sets, again via a filter, an associated memory which is reset again upon removal of the fault, and hence upon termination of the output signal of the comparator 25, be it via a filter having a substantially longer delay time of from 150 to 1000 μs. This longer delay time serves to avoid unnecessary switching over of the memory by a data transmission during the switching-over from the standby state to the normal mode.

In the case of a fault 4 the line 12 is short-circuited to ground so that it continuously carries a dominant signal, whereas in the case of the fault 7 both lines are short-circuited and hence always one of the two lines carries a dominant signal, so that the comparator 21 continuously outputs a dominant signal. If this signal prevails for a predetermined period of time, a further memory is set. This predetermined period of time must be longer than the duration of the maximum number of dominant bits during a data transmission. The end of the fault 4 or 7 is detected via a sufficiently long recessive output signal at the comparator 21, so that the relevant memory is reset.

The faults are detected independently of one another, but many faults lead to the phenomenon that upon occurrence of one fault, or after expiration of all time conditions, several faults are simultaneously detected in the steady state. A priority circuit, having the priority order fault 3 fault 6, fault 4 or 7, signals exactly one of the feasible faults.

Fault treatment

In the case of a fault, the non-disturbed line is used for the further data transmission in as far as possible. Depending on the fault detected, therefore, the outputs of the comparators 22 or 23, evaluating the potential transitions on the lines 11 or 12 alone, are connected to the data output instead of the output of the comparator 21. Moreover, in the case of some faults one of the terminating resistors is disconnected and the driving of one of the transmitter switches is prevented.

In the case of fault 3, the line 11 becomes inoperative and the comparator 23 for the line 12 is connected to the data output. The terminating resistor of the line 11 is disconnected and the driving of the transmission switch for the line 11 is inhibited.

In the case of the fault 6, the line 12 is disturbed; consequently, the output of the comparator 22, evaluating the line 11, is connected to the data output, the terminating resistor of the line 12 is disconnected and the driving of the transmission switch for the line 12 is inhibited.

In the case of the fault 7, both lines are short-circuited, so that the driving and evaluation of the signals of one of the two lines is interrupted. This is effectively the line 12, so that the further data transmission takes place via the line 11, the terminating resistor for the line 12 then being disconnected and the driving of the transmission switch for the line 12 being inhibited. These steps correspond to the fault 6, and the output of the comparator 22 is connected to the data output. The same steps are also taken for the fault 4 where the line 12 is disturbed.

Fault treatment in the standby state

No data transmission is possible in the standby state and the system is in a state of low power consumption. In this state, the faults 1, 2, 5 and 6 do not cause increased power consumptions. Merely the faults 3, 4 and 7 must be detected so as to avoid increased power consumption. To this end, three further comparators 91, 92 and 93 are used, the comparators 91 and 92 evaluating the state of the line 11 whereas the comparator 93 evaluates the state of the line 12. The comparator 91 has a threshold value which is approximately 2 V below the supply voltage; the comparator 92 has a threshold value of approximately 2 V in order to detect the dominant state on the line 11, and the comparator 93 has a threshold voltage of approximately 3 V in order to detect the dominant state on the line 12.

In the case of the fault 3, the line 11 is short-circuited to the supply voltage, so that the comparator 91 is activated. The terminating resistor of the line 11 is then disconnected via a time delay.

In the case of the fault 4, the line 12 is short-circuited to ground, so that the comparator 93 is activated. Therefore, the terminating resistor of the line 12 is also disconnected after a time delay.

When the fault 7 is detected, a larger voltage range of the supply voltage must be taken into account. Depending on the number of stations in the system, the resultant terminating resistance amounts to from approximately 100 to 200 ohms for the line 11 to ground and from 250 to 5000 ohms for the line 12 to the supply voltage. As a result, voltages of from approximately 0.3 to 8 V are reached in the case of the fault 7, i.e. in the case of a short-circuit between the lines 11 and 12. Consequently, at least one of the comparators 92 or 93 generates an output signal. An OR-combination of these comparator outputs disconnects the terminating resistor of the line 12 via a time delay. Because of the distributed disconnection of these terminating resistors in the system, the potential on the two short-circuited lines 11 and 12 increases with respect to ground. Because of the overlapping threshold voltages at the comparators 92 and 93 it is ensured that at least one of these comparators outputs an output signal during the traversing of the voltage range. After all terminating resistors have been disconnected, the comparator 93 ultimately supplies an output signal.

It is to be noted that in the case of the fault 3 the comparator 92 also generates an output signal, even though the terminating resistor of the line 11 is disconnected in the case of this fault. Therefore, the output signal of the comparator 92 is latched by the output signal of the comparator 91. Additional latching of the disconnection signal for the terminating resistor of the line 12 by the signal for disconnection of the terminating resistor for the line 11 ensures that the two terminating resistors are not disconnected simultaneously in any fault case or in any transitional state.

It is thus ensured that in the operating state a logically still existing possibility for data transmission is utilized in any fault case, whereas in the standby state increased power consumption is reliably prevented in any fault case.

We claim:

1. A system for the transmission of binary data between a number of stations which are interconnected via a common first line and a common second line, the first line having a low potential and the second line a high potential for one logic value of the binary data whereas the first line has a high potential and the second line a low potential for the other logic value of the binary data, the logic value of the binary data being derived from the potential of at least one line, for output on a data output, said system comprising:

a first station including a first comparator coupled to both lines and configured to subtract the potential on the first line from the potential on the second line and provide an output signal of a first value via a first comparator output if the difference formed by the subtraction exceeds a first threshold value, said first threshold value being chosen so that the output signal of the first comparator also changes its value if a potential transition occurs on only one of the two lines and the other line has a potential corresponding to the one logic value of the binary data.

2. A system as claimed in claim 1, said first station comprising:

a second comparator coupled to the first line and configured to generate an output signal of the first value on a second comparator output if the potential on the first line is below a second threshold value a first memory;

first delay member having a first delay time, wherein said first memory is coupled to the first comparator output via said first delay member; and a switch, wherein an output of said memory is coupled to said switch for switching the data output from the first comparator output to the second comparator output if the output signal on the first comparator output continuously has the first value for a period of time corresponding to the first delay time.

3. A system as claimed in claim 2, said system comrpising:

a second delay member having a second delay time, wherein the first memory in said first station is also coupled, via said second delay member, to the first comparator output such that the first memory switches over the switch such that the data output is switched back from the second comparator output to the first comparator output if the output signal on the first comparator output does not have the first value for a period of time corresponding to the second delay time.

4. A system as claimed in claim 3, said system comprising:

a supply voltage;

an electric circuit; and a third line, said first station comprising:
a third comparator;
a fourth comparator;
a fifth comparator;
a second memory;
a third memory; and
a third delay member having a third delay time, wherein said supply voltage is configured to provide a lower operating voltage in at least some stations for operation of said electric circuit in the stations to drive the first and the second line, at least a part of these stations being connected via said third line which carries the supply voltage, the third comparator being coupled to the second line to generate an output signal of the first value on a third comparator output if the potential on the second line exceeds a third threshold value, the fourth comparator being coupled to the first line and the fifth comparator being coupled to the second line, each of the fourth and fifth comparators generating an output signal of a first value on a fourth and a fifth comparator output, respectively, if the potential on the line coupled to the relevant comparator exceeds a fourth threshold value which is valued between the operating voltage and the supply voltage, each of said second and third memories comprising a first and a second input and an output, the first input of the second memory being connected to the first comparator output, the second input of the second memory being connected to the fourth comparator output, the first input of the third memory being connected to the fifth comparator output, the second input of the third memory being connected to the fifth comparator output via said third delay member the output of the second memory is coupled to the switch to couple the third comparator output to the data output, the output of the third memory being coupled to the switch to couple the second comparator output to the data output.

5. A system as claimed in claim 4, said system comprising a fault indication output, said first station comprising:

a first counter; and a second counter, each of said first and second counters comprising a count input, a reset input and a count output, the count input of said first and second counters being coupled to the first comparator output, the reset input of the first counter being coupled to the second comparator output, the reset input of the second counter being coupled to the third comparator output, and the count output of said first and second counters and the output of the first, second, and third memories being coupled to the fault indication output.

6. A system as claimed in claim 3, wherein each line in each station comprises:

an associated switch coupled to the potential for the other logic value of the binary data; and a drive circuit configured to close said switch and said associated switch to transmit the other logic value of the binary data in the fault-free case, wherein the case of a fault where at least one of the two lines is low-impedance connected to a voltage which at least deviates from the potential corresponding to the other logic value of the binary data, the drive circuit is configured to prevent the closing of the switch associated with the relevant line.

7. A system as claimed in claim 2, said system comprising:

a supply voltage;

an electric circuit; and a third line, said first station comprising:
 a third comparator;
 a fourth comparator;
 a fifth comparator;
 a second memory;
 a third memory; and
 a third delay member having a third delay time, wherein said supply voltage is configured to provide a lower operating voltage in at least some stations for operation of said electric circuit in the stations to drive the first and the second line, at least a part of these stations being connected via said third line which carries the supply voltage, the third comparator being coupled to the second line to generate an output signal of the first value on a third comparator output if the potential on the second line exceeds a third threshold value, the fourth comparator being coupled to the first line and the fifth comparator being coupled to the second line, each of the fourth and fifth comparators generating an output signal of a first value on a fourth and a fifth comparator output, respectively, if the potential on the line coupled to the relevant comparator exceeds a fourth threshold value which is valued between the operating voltage and the supply voltage, each of said second and third memories comprising a first and a second input and an output, the first input of the second memory being connected to the first comparator output, the second input of the second memory being connected to the fourth comparator output, the first input of the third memory being connected to the fifth comparator output, the second input of the third memory being connected to the fifth comparator output via said third delay member the output of the second memory is coupled to the switch to couple the third comparator output to the data output, the output of the third memory being coupled to the switch to couple the second comparator output to the data output.

8. A system as claimed in claim 7, said system comprising a fault indication output, said first station comprising:

a first counter; and a second counter, each of said first and second counters comprising a count input, a reset input and a count output, the count input of said first and second counters being coupled to the first comparator output, the reset input of the first counter being coupled to the second comparator output, the reset input of the second counter being coupled to the third comparator output, and the count output of said first and second counters and the output of the first, second, and third memories being coupled to the fault indication output.

9. A system as claimed in claim 2, wherein each line in each station comprises:

an associated switch coupled to the potential for the other logic value of the binary data; and a drive circuit configured to close said switch and said associated switch to transmit the other logic value of the binary data in the fault-free case, wherein the case of a fault where at least one of the two lines is low-impedance connected to a voltage which at least deviates from the potential corresponding to the other logic value of the binary data, the drive circuit is configured to prevent the closing of the switch associated with the relevant line.

10. A system as claimed in claim 1, said system comprising:

a supply voltage;

an electric circuit; and a third line, said first station comprising:
 a third comparator;
 a fourth comparator;
 a fifth comparator;
 a second memory;
 a third memory; and
 a third delay member having a third delay time, wherein said supply voltage is configured to provide a lower operating voltage in at least some stations for operation of said electric circuit in the stations to drive the first and the second line, at least a part of these stations being connected via said third line which carries the supply voltage, the third comparator being coupled to the second line to generate an output signal of the first value on a third comparator output if the potential on the second line exceeds a third threshold value, the fourth comparator being coupled to the first line and the fifth comparator being coupled to the second line, each of the fourth and fifth comparators generating an output signal of a first value on a fourth and a fifth comparator output, respectively, if the potential on the line coupled to the relevant comparator exceeds a fourth threshold value which is valued between the operating voltage and the supply voltage, each of said second and third memories comprising a first and a second input and an output, the first input of the second memory being connected to the first comparator output, the second input of the second memory being connected to the fourth comparator output, the first input of the third memory being connected to the fifth comparator output, the second input of the third memory being connected to the fifth comparator output via said third delay member the output of the second memory is coupled to the switch to couple the third comparator output to the data output, the output of the third memory being coupled to the switch to couple the second comparator output to the data output.

11. A system as claimed in claim 10, said system comprising a fault indication output, said first station comprising:
   a first counter; and
   a second counter, each of said first and second counters comprising a count input, a reset input and a count output, the count input of said first and second counters being coupled to the first comparator output, the reset input of the first counter being coupled to the second comparator output, the reset input of the second counter being coupled to the third comparator output, and the count output of said first and second counters and the output of the first, second, and third memories being coupled to the fault indication output.

12. A system as claimed in claim 11, wherein each line in each station comprises:
   an associated switch coupled to the potential for the other logic value of the binary data; and
   a drive circuit configured to close said switch and said associated switch to transmit the other logic value of the binary data in the fault-free case, wherein the case of a fault where at least one of the two lines is low-impedance connected to a voltage which at least deviates from the potential corresponding to the other logic value of the binary data, the drive circuit is configured to prevent the closing of the switch associated with the relevant line.

13. A system as claimed in claim 11, said system comrpising;
   a first resistor;
   a second resistor;
   a first switch; and
   a second switch, wherein the first line in said first station is coupled to the low potential via said first resistor, the second line is coupled to the high potential via said second resistor, said first switch is connected in series with the first resistor, said second switch is connected in series with the second resistor, the output of the second memory is coupled to the first switch, and the outputs of the first memory and the third memory are coupled together to the second switch.

14. A system as claimed in claim 10, said system comrpising:
   a first resistor;
   a second resistor;
   a first switch; and
   a second switch, wherein the first line in said first station is coupled to the low potential via said first resistor, the second line is coupled to the high potential via said second resistor, said first switch is connected in series with the first resistor, said second switch is connected in series with the second resistor, the output of the second memory is coupled to the first switch, and the outputs of the first memory and the third memory are coupled together to the second switch.

15. A system as claimed in claim 14, said system comprising:
   a third resistor;
   a sixth comparator; and
   a seventh comparator, wherein said system is configured such that in a standby state, in which the power consumption is substantially reduced by switching off the operating voltage for the comparators, the memories and the counters, the second line is coupled only to the higher supply voltage, via said third resistor, and wherein said sixth and seventh comparators are active in the standby state, said sixth comparator being coupled to the first line to generate an output signal of a first value on a sixth comparator output if the potential on the first line exceeds a predetermined fifth threshold value, the sixth comparator output being coupled to the first switch, said seventh comparator being coupled to the second line to generate an output signal of a first value on a seventh comparator output if the potential on the second line drops below a predetermined sixth threshold value, the seventh comparator output being coupled to the second switch.

16. A system as claimed in claim 15, said system comprising an eigth comparator configured to be active in the standby state and is coupled to the first line to generate an output signal of a first value on an eigth comparator output if the potential on the first line exceeds a predetermined seventh threshold value, the eigth comparator output also being coupled to the first switch if the sixth comparator output does not generate an output signal of the first value.

17. A system as claimed in claim 10, wherein each line in each station comprises:
   an associated switch coupled to the potential for the other logic value of the binary data; and
   a drive circuit configured to close said switch and said associated switch to transmit the other logic value of the binary data in the fault-free case, wherein the case of a fault where at least one of the two lines is low-impedance connected to a voltage which at least deviates from the potential corresponding to the other logic value of the binary data, the drive circuit is configured to prevent the closing of the switch associated with the relevant line.

18. A system as claimed in claim 1, wherein each line in each station comprises:
   an associated switch coupled to the potential for the other logic value of the binary data; and
   a drive circuit configured to close said switch and said associated switch to transmit the other logic value of the binary data in the fault-free case, wherein the case of a fault where at least one of the two lines is low-impedance connected to a voltage which at least deviates from the potential corresponding to the other logic value of the binary data, the drive circuit is configured to prevent the closing of the switch associated with the relevant line.

19. A system as claimed in claim 18, said system comprising:

a first resistor;

a second resistor;

a first switch; and a second switch, wherein the first line in said first station is coupled to the low potential via said first resistor, the second line is coupled to the high potential via said second resistor, said first switch is connected in series with the first resistor, said second switch is connected in series with the second resistor, the output of the second memory is coupled to the first switch, and the outputs of the first memory and the third memory are coupled together to the second switch.

20. A station for a system as claimed in claim 1.

* * * * *